US010587518B2

(12) United States Patent
Ravuri (10) Patent No.: US 10,587,518 B2
(45) Date of Patent: Mar. 10, 2020

(54) IDENTIFYING NETWORK CONDITIONS (71) Applicant: Imagination Technologies Limited, Kings Langley (GB)

(72) Inventor: Kiran Kumar Ravuri, Hyderabad (IN)

(73) Assignee: Imagination Technologies Limited, Kings Langley (GB)

(*) Notice: Subject to any disclaimer, the term of this patent is extended or adjusted under 35 U.S.C. 154(b) by 0 days.

(21) Appl. No.: 15/749,234

(22) PCT Filed: Sep. 30, 2016

(86) PCT No.: PCT/IB2016/055888
§ 371 (c)(1),
(2) Date: Jan. 31, 2018

(87) PCT Pub. No.: WO2017/021943
PCT Pub. Date: Feb. 9, 2017

(65) Prior Publication Data
US 2018/0227231 A1 Aug. 9, 2018

(30) Foreign Application Priority Data
Jul. 31, 2015 (GB) .................................. 1513523.9

(51) Int. Cl.
H04L 12/26 (2006.01)
H04L 12/803 (2013.01)
(Continued)

(52) U.S. Cl.
CPC ........ H04L 47/122 (2013.01); H04L 41/5025 (2013.01); H04L 43/0852 (2013.01); H04L 43/0882 (2013.01); H04L 43/106 (2013.01); H04L 47/11 (2013.01); H04L 47/25 (2013.01); H04L 47/283 (2013.01);
(Continued)

(58) Field of Classification Search
CPC ......... H04L 47/10; H04L 47/127; H04L 47/11
See application file for complete search history.

(56) References Cited

U.S. PATENT DOCUMENTS 6,032,189 A * 2/2000 Jinzenji ................... H04L 29/06
370/230
6,442,139 B1 8/2002 Hosein
(Continued)

FOREIGN PATENT DOCUMENTS

GB 2519835 A 5/2015
JP 2002314595 A 10/2002
(Continued)

Primary Examiner — Siren Wei
(74) Attorney, Agent, or Firm — Potomac Law Group, PLLC; Vincent M DeLuca (57) ABSTRACT A method of identifying a network condition between a pair of network devices, the method comprising: determining a first time period between receiving a first-received packet for an initial media frame and receiving a first-received packet for a subsequent media frame, wherein the packets are received at one of the devices via a network and each received packet comprises a timestamp; determining a second time period between the timestamp of the packet for the initial media frame and the timestamp of the packet for the subsequent media frame; and identifying a network condition in dependence on a difference between the first and second time periods.

17 Claims, 3 Drawing Sheets (51) Int. Cl.
  *H04L 12/801* (2013.01)
  *H04L 29/06* (2006.01)
  *H04L 12/825* (2013.01)
  *H04L 12/24* (2006.01)
  *H04L 12/841* (2013.01)

(52) U.S. Cl.
  CPC ........ *H04L 65/4092* (2013.01); *H04L 65/602* (2013.01); *H04L 65/80* (2013.01); *H04L 43/0888* (2013.01)

(56) References Cited

U.S. PATENT DOCUMENTS

| | | | |
|---|---|---|---|
| 9,094,307 | B1 | 7/2015 | Edsall et al. |
| 2002/0007429 | A1 | 1/2002 | Boulandet |
| 2002/0136164 | A1* | 9/2002 | Fukuda ................ H04L 47/10 370/230 |
| 2006/0233203 | A1 | 10/2006 | Iwamura |
| 2006/0277051 | A1 | 12/2006 | Barriac et al. |
| 2007/0121597 | A1 | 5/2007 | Lee et al. |
| 2010/0110892 | A1 | 5/2010 | Lai et al. |
| 2011/0075582 | A1 | 3/2011 | Sugiyama et al. |
| 2013/0117842 | A1 | 5/2013 | Kakadia et al. |
| 2014/0153431 | A1 | 6/2014 | Lundin et al. |
| 2014/0169162 | A1* | 6/2014 | Romano ................ H04L 47/25 370/230 |
| 2015/0092585 | A1* | 4/2015 | Shao ................ H04L 43/087 370/252 |

FOREIGN PATENT DOCUMENTS

| | | |
|---|---|---|
| KR | 10-2010-0133776 A | 12/2010 |
| WO | 97/22201 A2 | 6/1997 |
| WO | 00/55829 A1 | 9/2000 |

* cited by examiner

IDENTIFYING NETWORK CONDITIONS

BACKGROUND OF THE INVENTION

This invention relates to a method and device for identifying network conditions.

Real-time streaming of multimedia content over the internet has become an increasingly common application in recent years. A wide range of multimedia applications, such as on-demand TV, live TV viewing, audio streaming, video conferencing, net meetings, video telephony, voice over internet protocol (VoIP) and many others rely on end-to-end streaming solutions. Unlike a "downloaded" media file, which may be retrieved first in "non-real" time and played back later, streaming media applications require a media source to encode and to transmit a media signal over a network to a media receiver, which must decode and playback the media signal in real time.

Problems can arise when streaming media across a network, such as the Internet. For example, the network link between a pair of network end-points may become congested, which can lead to a deterioration in the quality of service of that link. The effects of network congestion includes queueing delay, packet loss and blocking of new connections. This, in turn, can lead to a degradation in the quality and timeliness of the media being played out at the receiving end-point.

One of the causes of network congestion is buffer-bloat. Network elements usually employ buffers to accommodate bursty incoming traffic. These buffers begin to be filled or bloated whenever incoming bandwidth exceeds outgoing bandwidth. This can cause packets to become queued in those buffers for a significant period of time, especially in network elements that have large buffers. In a first-in first-out queuing system, overly large buffers of network elements result in longer queues and higher latency which causes the network to be congested.

When streaming real-time media, for example, it may be desirable for the device transmitting the media stream to quickly adapt its transmission parameters in response to changes in the network so that real-time playback can be maintained at the receiving device. For example, when the network becomes congested, the transmitting device may reduce the transmission bandwidth of the media stream by reducing the quality of the media so that the media stream does not congest the network further and so that it takes less time for packets to reach the receiving device over the congested network. In order to quickly and appropriately adapt the transmission properties of the media stream in response to changeable network conditions, there is a need to be able to detect changes in the condition of the network and to determine the cause of those changes.

SUMMARY OF THE INVENTION

According to a first aspect there is provided a method of identifying a network condition between a pair of network devices, the method comprising: determining a first time period between receiving a first-received packet for an initial media frame and receiving a first-received packet for a subsequent media frame, wherein the packets are received at one of the devices via a network and each received packet comprises a timestamp; determining a second time period between the timestamp of the packet for the initial media frame and the timestamp of the packet for the subsequent media frame; and identifying a network condition in dependence on a difference between the first and second time periods.

The identifying step may comprise identifying congestion in the network if the first time period is greater than the second time period.

The identifying step may comprise identifying a change in a network route between the pair of network devices if the first time period is different to the second time period.

The method may further comprise: determining a third time period between receiving the first-received packet for the initial media frame and receiving a first-received packet for a second subsequent media frame; and determining a fourth time period between the timestamp of the packet for the initial media frame and a timestamp of the packet for the second subsequent media frame, wherein the identifying step further comprises identifying the network condition in dependence on a difference between the first and second time periods and a difference between the third and fourth time periods.

The identifying step may comprise identifying congestion in the network if the difference between the third and fourth time periods is greater than the difference between the first and second time periods.

The identifying step may comprise identifying an increase in network delay if the first time period is greater than the second time period and the difference between the third and fourth time periods is substantially the same as the difference between the first and second time periods.

The identifying step may comprise identifying a decrease in network delay if the first time period is less than the second time period.

The method may further comprise: at a first one of the network devices, sending an indication of said identified network condition to the other network device; and at said other network device, receiving said indication and adjusting a transmission bandwidth to said first network device in dependence on said indication.

The method may further comprise: at a first one of the network devices, sending an indication of the difference between the first and second time periods to the other network device; and at said other network device, receiving said indication and adjusting a transmission bandwidth to said first network device in dependence on said indication.

The packets may be RTP packets. The timestamps may be RTP timestamps. The time periods may be determined in dependence on a RTP wallclock.

According to a second aspect there is provided a data processing device for receiving a stream of media packets via a network, the device comprising: a transceiver configured to receive packets from another device via the network; a controller configured to: determine a first time period between receiving a first-received packet for an initial media frame and receiving a first-received packet for a subsequent media frame, wherein each received packet comprises a timestamp; determine a second time period between the timestamp of the packet for the initial media frame and the timestamp of the packet for the subsequent media frame; and identify a network condition in dependence on a difference between the first and second time periods.

The controller may be further configured to identify congestion in the network if the first time period is greater than the second time period.

The controller may be further configured to identify a change in a network route between the data processing device and said another device if the first time period is different to the second time period.

The controller may be further configured to: determine a third time period between receiving the first-received packet for the initial media frame and receiving a first-received packet for a second subsequent media frame; determine a fourth time period between the timestamp of the packet for the initial media frame and a timestamp of the packet for the second subsequent media frame; and identify the network condition in dependence on a difference between the first and second time periods and a difference between the third and fourth time periods.

The controller may be further configured to identify congestion in the network if the difference between the third and fourth time periods is greater than the difference between the first and second time periods.

The controller may be further configured to identify an increase in network delay if the first time period is greater than the second time period and the difference between the third and fourth time periods is substantially the same as the difference between the first and second time periods.

The controller may be further configured to identify a decrease in network delay if the first time period is less than the second time period.

The packets may be RTP packets. The timestamps may be RTP timestamps. The time periods may be determined in dependence on a RTP wallclock.

The transceiver may be further configured to send an indication of said identified network condition to said another device.

According to a third aspect there is provided a system comprising: a data processing device as described above; said another device; and the network, wherein said another device is configured to receive the indication and adjust a transmission bandwidth to the data processing device in dependence on the indication.

The transceiver may be further configured to send an indication of the difference between the first and second time periods to said another network device. Said another device may be configured to receive the indication and adjust a transmission bandwidth to the data processing device in dependence on the indication.

According to a fourth aspect there is provided machine readable code for implementing the method described above.

According to a fifth aspect there is provided a machine readable non-transitory storage medium having encoded thereon machine readable code for implementing the method described above.

DESCRIPTION OF THE DRAWINGS

The present invention will now be described by way of example with reference to the accompanying drawings. In the drawings.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
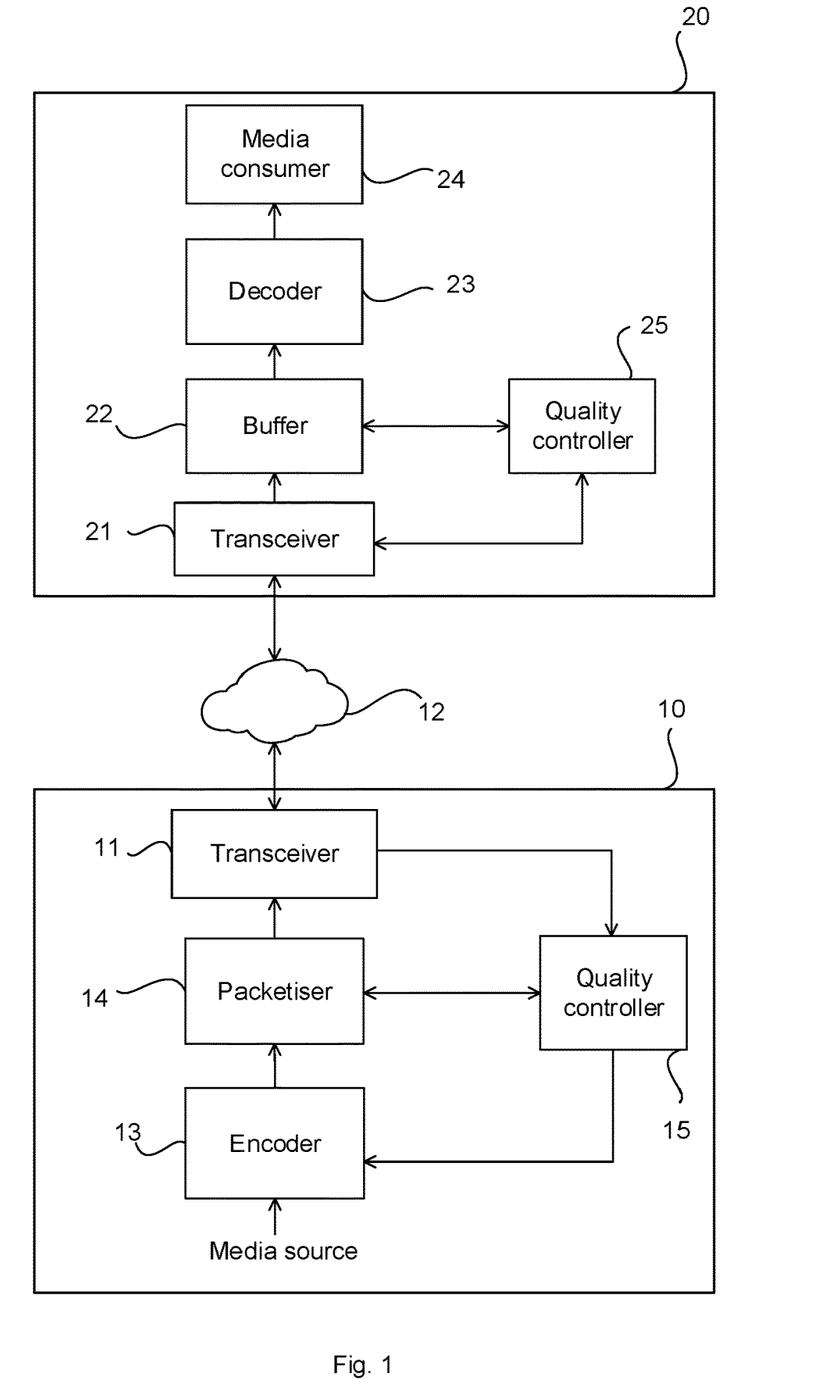
FIG. 1 shows an example of a transmitting device and a receiving device.

FIG. 1 depicts a transmitting device 10, which may be any suitable device that is capable of generating packet based data such as a computer, smartphone, videophone, etc. The transmitting device 10 comprises a transceiver 11 for connection to a communications network 12 such as the internet or other packet based networks. The transmitting device 10 can transmit and/or receive packets to and/or from the communications network 12 via the transceiver 11.

The transmitting device 10 comprises an encoder 13 for encoding media data (e.g. video and/or audio data) that is to be transmitted over the communications network 12 to a receiving device 20. The media data may be from a media source such as a camera and/or microphone, storage device, etc (not shown). The encoder 13 may encode the media data into media frames. Each frame may comprise a timestamp or sequence number which indicates the playout order of the frame and/or a time that the frame is to be played out. The timestamp may indicate the time the media from the media source was sampled (i.e. a sampling instant) according to a reference clock or wallclock that is synchronised at the transmitting and receiving devices 10 and 20. The frames may be encoded so that they are played out at a specified frame rate. The encoder 13 may encode the media data according to a coding standard such as ITU-T Recommendation H.264 or ISO/IEC International Standard 14496-10 (both also known as Advanced Video Coding (AVC)), MPEG-DASH, HTTP Live Streaming or any other suitable codec.

The transmitting device 10 comprises a packetiser 14 which receives the encoded media frames from the encoder 13 and packetises the frames into a sequence of packets for transmission over the network 12 via the transceiver 11. Each frame may be packetised into one or more packets. Each packet may indicate the timestamp for its frame, e.g., in the packet header. Packets that belong to the same media frame may comprise the same timestamp. As mentioned above, the timestamp may be derived from a reference clock or wallclock that is common between the transmitting device 10 and receiving device 20. The packetiser 14 may packetise the media in accordance with a Real-time Transport Protocol (RTP) standard. Other standardised packet formats may be used. The packetiser 14 provides the packets to the transceiver 11 for transmission over the network 12 to receiving device 20.

The receiving device 20 comprises a transceiver 21 for receiving packets from the network 12. The packets are provided to a buffer 22, which may be a jitter buffer that is capable of ordering the packets according to a playout sequence of the media data in the packets. This sequence may be indicated by a sequence number or timestamp contained in each packet. A decoder 23 decodes the packets in the order provided to it by the buffer 22 to form a media stream. The decoder 23 decodes packets according to the codec used by the encoder 13. A media consumer 24 receives the decoded media stream for playback. In the example shown in FIG. 1, the media consumer 24 may be an audio and/or video player, the data packets carrying media data may be RTP packets and the media stream may be video and/or audio stream.

As mentioned above, the condition of the network 12 may change (e.g. become congested), which may lead to a delay in receiving packets at the receiving device 20. This delay may lead to complete frames being received too late for them to be played out on time by the media consumer 24. Thus, it is desirable to determine if the condition of the network 12 has changed and how it has changed so that the transmitting device 10 can appropriately adapt its transmission in order to compensate for the change. The transmission device 10 may comprise a quality controller 15, which is capable of adjusting the transmission properties (such as bandwidth, media quality, packet size, etc) of the media stream.

The receiving device 20 comprises a quality controller 25 for identifying changes in the network 12. The quality controller 25 is capable of determining when packets are received by the receiving device 20. The time that a packet is received may be derived from the wallclock or an internal clock (not shown), which may not necessarily be synchronised with the wallclock. The quality controller 25 is also capable of determining the time indicated by timestamp comprised in each packet. The quality controller 25 is capable of identifying changes in the condition of the network by comparing the times that packets are received with the times indicated by the timestamps of those packets, as discussed in further detail below. The quality controller 25 may send an indication of the identified change to the transmitting device 10 so that it can appropriately adjust its transmission parameters. The quality controller 25 may also adjust some of its reception parameters (e.g. target jitter buffer size) in response to some network conditions.

The quality controller 25 uses a congestion measure to identify network conditions between the transmitting and receiving devices such as congestion, route changes, etc. The congestion measure is determined using the inter-arrival times between each newly received frame and a reference frame. As mentioned above, each frame may be made up from one or more packets having the same timestamp. The inter-arrival times between frames is determined by comparing the first-received packet for each frame. Each frame has a different timestamp and so the quality controller 25 is able to determine that a packet for a new frame has arrived if the timestamp of that packet has not previously been received. The first-received packet for each frame may not necessarily be the first packet that has been packetised or transmitted by the transmitting device 10 because of packet loss, varying network paths, etc in the network 12. The first-received packet is the first packet received by the receiving device 20 for a particular frame. Thus, a complete frame is not required to be received (i.e. all of the packets required to build the complete frame) in order to compare the arrival times between frames.

The inter-arrival times of the first received packet between a newly received frame and a reference frame is compared against the difference in time between the timestamps of those frames. This comparison is used to form the congestion measure. Equation 1 is an example of how the comparison could be made:

$$\text{Congestion measure}=(\text{CurrentFrameRx}-\text{RefFrameRx})-(\text{CurrentFrameTS}-\text{RefFrameTS}) \quad (1)$$

Where CurrentFrameRx is the time when the first packet is received for the current frame, RefFrameRX is the time when the first packet is received for the reference frame, CurrentFrameTS is the timestamp for the current frame and RefFrameTS is the timestamp in the reference frame. As mentioned above, the timestamp for a frame may be comprised in each packet for that frame. Alternatively, the timestamp may be determined from building a complete frame by receiving all of the packets necessary for building that frame.

Equation 2 is an example of how the congestion measure can be determined in a system which uses RTP packets to send media data:

$$\text{Congestion measure}=(\text{CurrentFrameRx}-\text{RefFrameRx})-[(\text{CurrentFrameTS}-\text{RefFrameTS})/90] \quad (2)$$

Where CurrentFrameRx is the time in milliseconds when the first RTP packet is received for the current frame, RefFrameRX is the time milliseconds when the first RTP packet is received for the reference frame, CurrentFrameTS is the timestamp comprised in the RTP header of the first RTP packet for the current frame and RefFrameTS is the timestamp comprised in the RTP header of the first RTP packet for the reference frame. Dividing by 90 converts the RTP time units into milliseconds.

If the congestion measure is zero or within some threshold that is close to zero, then it is considered that packets received from the network are "on-time" and so the network is operating satisfactorily for the purposes of the media stream. The reference frame is considered to be a frame that has arrived on-time according to the best available knowledge. Initially, the first frame of the media stream is chosen to be the reference frame. Subsequently, the reference frame is updated whenever a frame arrives on-time or within some threshold.

As mentioned above, the time when the first-received packet for a frame is used to determine when a frame has arrived rather than when all of the packets to complete the frame has arrived. This provides a congestion measure that is insensitive to variations in packet loss, out-of-order packets, retransmission of packets and packet sizes.

FIGS. 2a-2d illustrate various scenarios which show how the congestion measure can be used to determine the condition of a network.

Figure 2A:
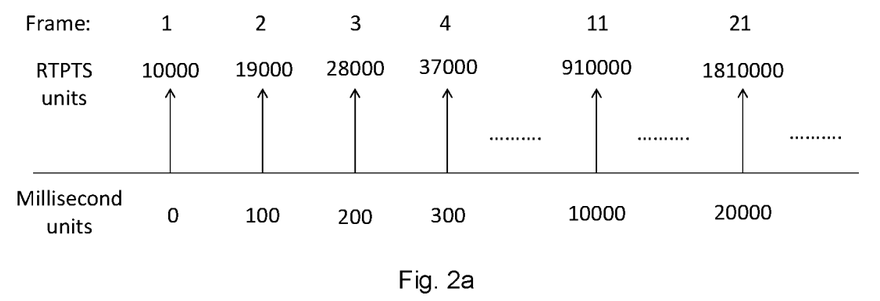
FIGS. 2a-2d illustrate packet reception timings under various network conditions.

FIG. 2a illustrates a scenario where the network is operating under normal conditions. Each arrow represents a media frame sent using the RTP protocol. The RTP time stamp (RTPTS) for that frame is indicated above the arrows. The time when then the first packet for each of the frames is received is indicated by the time below the arrows (in milliseconds). This time is shown as a time relative to the first frame, but could also be an absolute time. In this case the first frame is selected to be the reference frame. Using equation 2 for RTP packets, the congestion measure for each frame is calculated as follows:

Congestion measure=(0−0)−((10000−10000)/90)=0     1st frame

Congestion measure=(100−0)−((19000−10000)/90)= (100−100)=0     2nd frame

Congestion measure=(200−0)−((28000−10000)/90)= (200−200)=0     3rd frame

Congestion measure=(300−0)−((37000−10000)/90)= (300−300)=0     4th frame

Congestion measure=(10000−0)−((910000−10000)/ 90)=(10000−10000)=0     11th frame Congestion measure=(20000−0)−((1810000−10000)/ 90)=(20000−20000)=0     21st frame In this scenario, the congestion measure is a constant value of zero from the $1^{st}$ frame to the $21^{st}$ frame. This indicates that the frames are reaching the receiving device 20 on-time and so the network is operating satisfactorily for the purposes of the media stream.

Figure 2B:
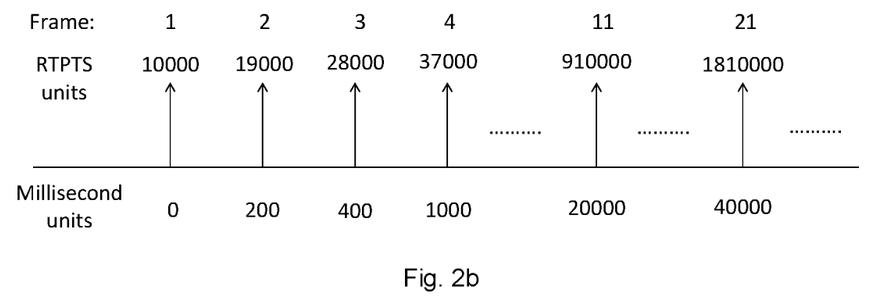

FIG. 2b illustrates a scenario where there is congestion in the network. Using equation 2, the congestion measure for each frame is calculated as follows:

Congestion measure=(0−0)−((10000−10000)/90)=0   1st frame

Congestion measure=(200−0)−((19000−10000)/90)= (200−100)=100   2nd frame

Congestion measure=(400−0)−((28000−10000)/90)= (400−200)=200   3rd frame

Congestion measure=(1000−0)−((37000−10000)/90)= (1000−300)=700   4th frame

Congestion measure=(20000−0)−((910000−10000)/90)=(20000−10000)=10000   11th frame Congestion measure=(40000−0)−((1810000−10000)/90)=(40000−20000)=20000   21st frame This scenario differs from the FIG. 2a scenario as the first-received packet for the $2^{nd}$ to $21^{st}$ frames are being received in an increasingly delayed manner. During congestion, the congestion measure, over time, is proportional to the mismatch between the sending bitrate and the bandwidth of the network. At other times, the congestion measure is close to zero or below some threshold indicating no congestion.

The manner in which the congestion measure increases depends on the sending bandwidth, choke bandwidth (or throttling) and network usage. It is possible to infer where the cause of the congestion may lie between devices 10 and 20. For example, a first set of congestion measure values may be determined at device 20 for packets sent from device 10 and a second set of congestion measure values may be determined at device 10 for packets sent from device 20. Devices 10 and 20 may share their determined congestion measure values with each other. It may be determined from those shared values that the path from device 10 to device 20 is congested whilst the path from device 20 to device 10 is operating satisfactorily. From this it is possible to infer that the congestion may be caused by the sending bandwidth at device 10 rather than due to a reduction in the available bandwidth of network 12 because the congestion is only seen in one direction rather than both directions through the network 12. Similarly, if it is determined that both paths are congested then it is possible to infer that there is a problem with the network 12 (such as a reduction in the available bandwidth).

Figure 2C:
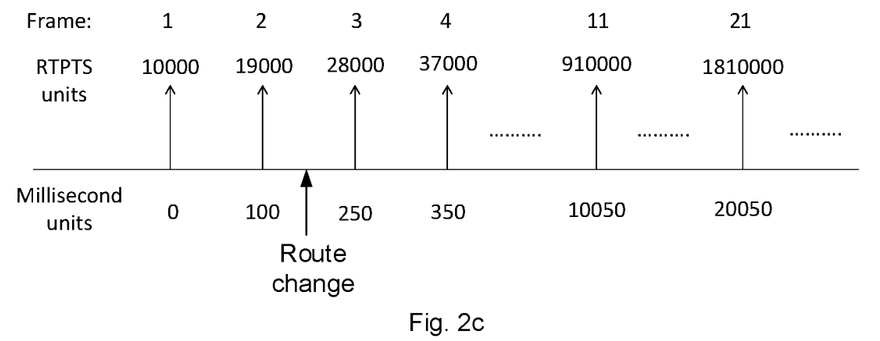

FIG. 2c illustrates a scenario where there is a single increase in network delay, which occurs between the second and third frame (as indicated in the figure). Using equation 2, the congestion measure for each frame is calculated as follows:

Congestion measure=(0−0)−((10000−10000)/90)=0   1st frame

Congestion measure=(100−0)−((19000−10000)/90)= (100−100)=0   2nd frame

Congestion measure=(250−0)−((28000−10000)/90)= (250−200)=50   3rd frame

Congestion measure=(350−0)−((37000−10000)/90)= (350−300)=50   4th frame

Congestion measure=(10050−0)−((910000−10000)/90)=(10050−10000)=50   11th frame

Congestion measure=(20050−0)−((1810000−10000)/90)=(20050−20000)=50   21st frame

In this scenario the congestion measure increases for the third frame and remains at that increased value for the subsequent frames. As the delay is constant (rather than increasing, as is the case for FIG. 2b), this indicates that the delay is not due to congestion. This increase in delay indicates, for example, that there has been a change in the network path (as depicted by the route change arrow in FIG. 2c) which leads to a longer amount of time for packets to be transported from the transmitting device 10 to the receiving device 20. Preferably, when this scenario is determined by the quality controller 25, the constant value (50, in this example), is subtracted from the calculation of the congestion measure until the reference frame has been updated.

Figure 2D:
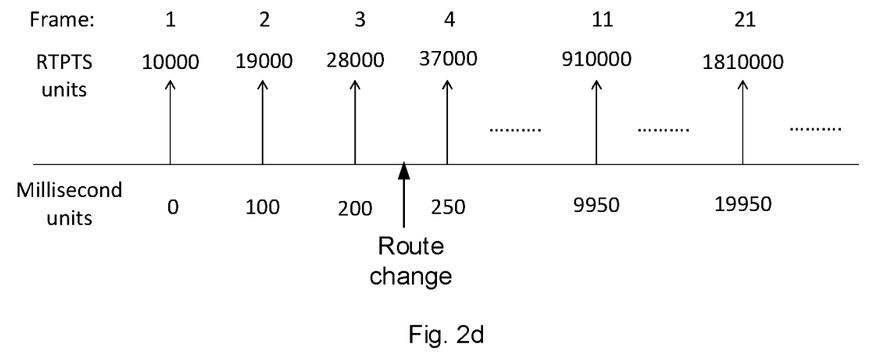

FIG. 2d illustrates a scenario where there is a single decrease in network delay, which occurs between the third and fourth frames, as indicated in the figure. Using equation 2, the congestion measure for each frame is calculated as follows:

Congestion measure=(0−0)−((10000−10000)/90)=0   1st frame

Congestion measure=(100−0)−((19000−10000)/90)= (100−100)=0   2nd frame

Congestion measure=(200−0)−((28000−10000)/90)= (200−200)=0   3rd frame

Congestion measure=(250−0)−((37000−10000)/90)= (250−300)=−50   4th frame

Update the reference frame, RefFrame=FourthFrame

Congestion measure=(9950−250)−((910000−37000)/90)=(9700−9700)=0   11th frame

Congestion measure=(19950−250)−((1810000−37000)/90)=(19700−19700)=0   21st frame In this scenario the congestion measure decreases for the fourth frame. The decrease indicates, for example, that there has been a change in the network path (as depicted by the route change arrow in FIG. 2d) which leads to a shorter amount of time for packets to be transported from the transmitting device to the receiving device. In this case, the fourth frame is considered to be received on-time and so the reference frame is updated from the first frame to the fourth frame for calculating the congestion measure for subsequent frames.

Preferably (in addition to the FIG. 2d scenario), the reference frame is updated occasionally or periodically since clock skew between the sender and receiver may lead to a gradual change in the congestion measure value. It is advantageous to update the reference frame at least once after initialisation, since it may not be known whether the first frame is "on-time" or experiencing congestion.

The quality controller 25 may monitor the congestion measure to determine the condition of the network, as described by the scenarios above. The quality controller 25 may then transmit information indicative of the condition of the network to the transmitting device 10. Alternatively or additionally, the quality controller 25 may send the congestion measure and/or the CurrentFrameRx and RefFrameRx values and/or the CurrentFrameTS and RefFrameTS values to the transmitting device 10 so that quality controller 15 can similarly determine the condition of the network 12. The transmitting device 10 may then adjust its media transmission in dependence on the received information. For example, if it is determined that the network is congested, the quality controller 15 may, in response, cause the transmitting device 10 to reduce its transmission bandwidth. This may be achieved by, for example, reducing the quality of the media that is to be transmitted, increasing packet size (which reduces the packetisation overhead), reducing error correction redundancy, etc. Preferably, the transmission bandwidth will be reduced to be lower than the congested network bandwidth so that further congestion can be avoided. This will ensure that transmitted media packets arrive at the receiving device in a timely manner for playback.

The quality controller 15 or 25 may determine the condition of the network based on two or more values of the congestion measure exceeding a threshold. For example, a threshold value for congestion may be provided and if, e.g., three consecutively determined congestion measure values exceed this threshold, then it may be determined that the network is congested. This prevents any spurious or spiked values from falsely classifying the network as congested. Additionally or alternatively, an average of two or more congestion measure values may be used for determining the network condition rather than a single value. For example, the last three congestion measure values may be averaged to determine a current congestion measure value. Preferably, the number of congestion measure values used in either case is not excessive such that it causes a delay in responding to the detection of a network condition in a timely manner.

Figure 3:
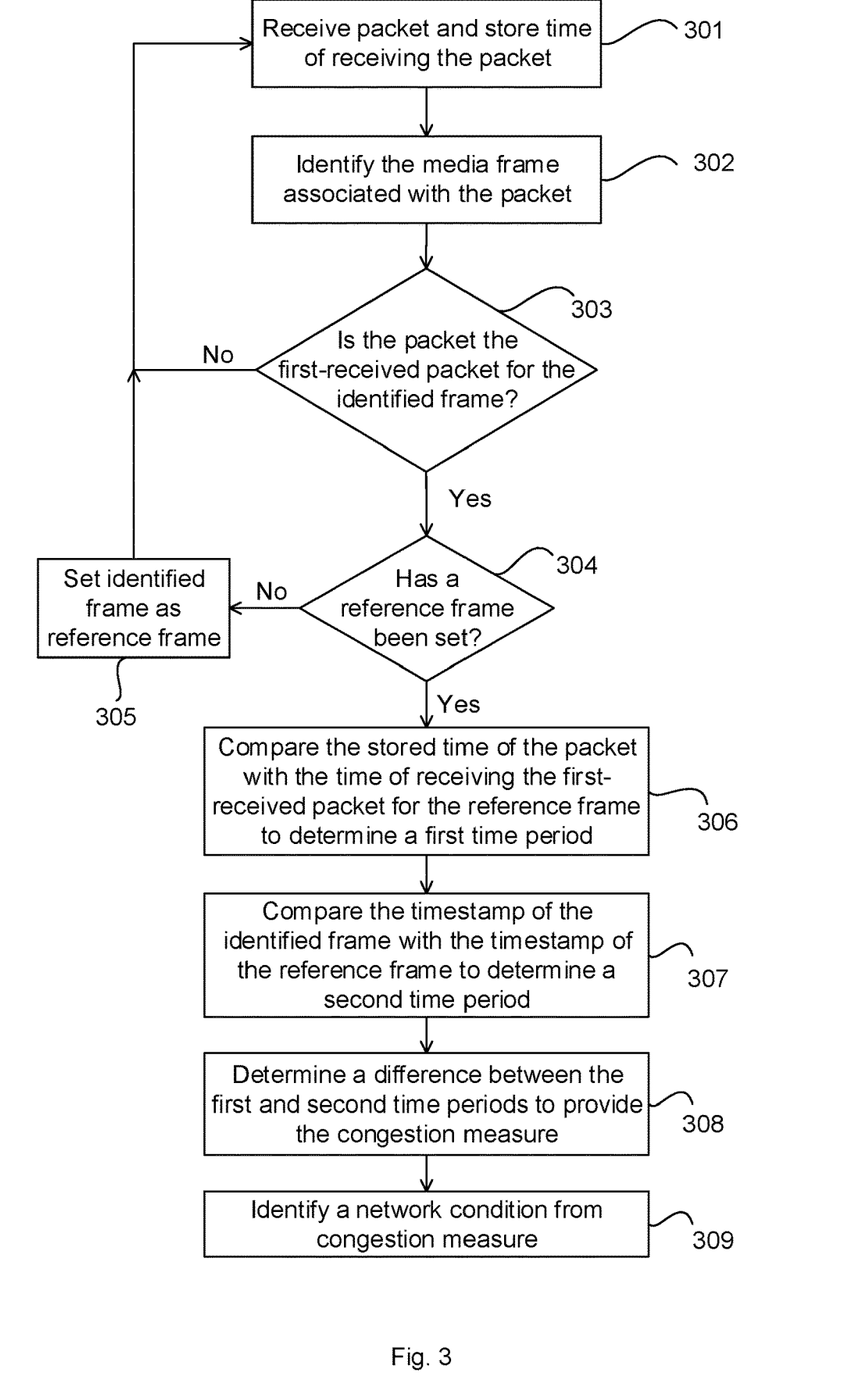
FIG. 3 depicts a process for identifying network conditions.

FIG. 3 is a flow diagram illustrating how network conditions between the transmitting and receiving devices 10 and 20 may be identified.

At step 301, a packet is received and the time that the packet is received is stored. As mentioned above, the time for receiving the packet may be determined from an internal clock of the receiving device.

At step 302, the media frame associated with the packet is determined. As mentioned above, the media frame associated with a packet may be identified in the header of the packet.

At step 303, it is determined if the packet is the first-received packet for the identified frame. If the packet is the first-received packet for that frame (i.e. no other packets associated with that frame have been received previously), then the process moves on to step 304. If the packet is not the first-received packet for that frame (i.e. the packet is associated with a frame for which another packet has previously been received), then the process loops back to step 301.

At step 304, it is determined if a reference frame has been previously set. If not, then the frame associated with received packet is set to be the reference frame at step 305, where the time for receiving that packet (at 301) is stored along with the timestamp associated with the identified frame. The process then loops back to step 301. If a reference frame had been set previously, then the process moves on to step 306.

At step 306, the time that the packet was received (stored at step 301) and the time that the first-received packet for the reference frame was received is compared to determine a first time period. At step 307, the timestamp of the frame associated with the received packet and the timestamp of the reference frame is compared to determine a second time period.

At step 308, a difference between the first time period (determined at step 306) and the second time period (determined at step 307) is determined to provide a congestion measure value.

At step 309, the congestion measure value is used to identify network conditions. As mentioned above, the congestion measure value determined for one frame or the values for a number of consecutive frames may be used to identify network conditions. For example, if a single congestion measure value is negative then this may indicate that the delay in the network has decreased (e.g. as described above with reference to FIG. 2*d*). As mentioned above, the reference frame may then be set to be the frame associated with the negative congestion measure. In another example, if the congestion measure increases over a consecutive number of frames, then this may indicate that the network is congested (as described above with reference to FIG. 2*b*). The identified condition may then be used to adapt transmission properties of the media stream (as mentioned above).

The process of FIG. 3 may be performed for every packet received as part of the same media stream (as indicated by the process looping back to step 301).

The transmitting and receiving devices configured in accordance with the examples described herein could be embodied in hardware, software or any suitable combination of hardware and software. The transmitting devices may have the same capabilities as the receiving devices and vice versa. The devices as described herein could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the devices, and/or heterogeneous processors comprising one or more dedicated, programmable and general purpose processing functionalities. The devices described herein can comprise one or more processors and one or more memories having program code stored thereon, the processors and the memories being such as to, in combination, provide the claimed devices and/or perform the claimed methods.

Data processing units described herein (e.g. encoder, quality controller and packetizer) need not be provided as discrete units and represent functionalities that could (a) be combined in any manner, and (b) themselves comprise one or more data processing entities. Data processing units could be provided by any suitable hardware or software functionalities, or combinations of hardware and software functionalities.

The term software as used herein includes executable code for processors (e.g. CPUs and/or GPUs), firmware, bytecode, programming language code such as C or OpenCL, and modules for reconfigurable logic devices such as FPGAs. Machine-readable code includes software and code for defining hardware, such as register transfer level (RTL) code as might be generated in Verilog or VHDL.

Any one or more of the methods described herein could be performed by one or more physical processing units executing program code that causes the unit(s) to perform the methods. The or each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of identifying a network condition between a pair of network devices, the method comprising:
receiving, at a receiving device of the pair of network devices, packets from a transmitting device of the pair of network devices via a network;
determining a first time period between receiving a first-received packet for an initial media frame and receiving a first-received packet for a first subsequent media frame, wherein the packets are received at one of the devices via a network and each received packet comprises a timestamp;
determining a second time period between the timestamp of the packet for the initial media frame and the timestamp of the packet for the first subsequent media frame;
determining a third time period between receiving the first-received packet for the initial media frame and receiving a first-received packet for a second subsequent media frame;
determining a fourth time period between the timestamp of the packet for the initial media frame and a timestamp of the packet for the second subsequent media frame;
identifying a network condition in dependence on a difference between the first and second time periods and a difference between the third and fourth time periods; and
transmitting an indication of the identified network condition to the transmitting device so that the transmitting device can adjust its transmission properties in dependence on the identified network condition.

2. The method as claimed in claim 1, wherein the identifying step comprises identifying congestion in the network if the first time period is greater than the second time period.

3. The method as claimed in claim 1, wherein the identifying step comprises identifying a change in a network route between the pair of network devices if the first time period is different to the second time period.

4. The method as claimed in claim 1, wherein the identifying step comprises identifying congestion in the network if the difference between the third and fourth time periods is greater than the difference between the first and second time periods.

5. The method as claimed in claim 1, wherein the identifying step comprises identifying an increase in network delay if the first time period is greater than the second time period and the difference between the third and fourth time periods is substantially the same as the difference between the first and second time periods.

6. The method as claimed in claim 1, wherein the identifying step comprises identifying a decrease in network delay if the first time period is less than the second time period.

7. The method as claimed in claim 1, wherein transmitting an indication further comprises:
at a first one of the network devices, sending an indication of said identified network condition to the other network device; and
at said other network device, receiving said indication and adjusting a transmission bandwidth to said first network device in dependence on said indication.

8. The method as claimed in claim 1, wherein transmitting an indication further comprises:
at a first one of the network devices, sending an indication of the difference between the first and second time periods to the other network device; and
at said other network device, receiving said indication and adjusting a transmission bandwidth to said first network device in dependence on said indication.

9. A data processing device for receiving a stream of media packets via a network, the device comprising:
a transceiver configured to receive packets from a transmitting device via the network; and
a controller configured to:
determine a first time period between receiving a first-received packet for an initial media frame and receiving a first-received packet for a first subsequent media frame, wherein each received packet comprises a timestamp;
determine a second time period between the timestamp of the packet for the initial media frame and the timestamp of the packet for the first subsequent media frame;
determine a third time period between receiving a first-received packet for the initial media frame and receiving a first-received packet for a second subsequent media frame;
determine a fourth time period between the timestamp of the packet for the initial media frame and a timestamp of the packet for the second subsequent media frame;
identify a network condition in dependence on a difference between the first and second time periods and a difference between the third and fourth time periods; and
transmit an indication of the identified network condition to the transmitting device so that the transmitting device can adjust its transmission properties.

10. The device as claimed in claim 9, wherein the controller is further configured to identify congestion in the network if the first time period is greater than the second time period.

11. The device as claimed in claim 9, wherein the controller is further configured to identify a change in a network route between the data processing device and said another device if the first time period is different to the second time period.

12. The device as claimed in claim 9, wherein the controller is further configured to identify congestion in the network if the difference between the third and fourth time periods is greater than the difference between the first and second time periods.

13. The device as claimed in claim 9, wherein the controller is further configured to identify an increase in network delay if the first time period is greater than the second time period and the difference between the third and fourth time periods is substantially the same as the difference between the first and second time periods.

14. The device as claimed in claim 9, wherein the controller is further configured to identify a decrease in network delay if the first time period is less than the second time period.

15. A system comprising:
a data processing device as claimed in claim 9;
said transmitting device; and the network, wherein said transmitting device is configured to receive the indication and adjust a transmission bandwidth to the data processing device in dependence on the indication.

16. The device as claimed in claim 9, wherein the transceiver is further configured to send an indication of the difference between the first and second time periods to said transmitting device.

17. A machine readable non-transitory storage medium having encoded thereon machine readable code for implementing a method of identifying a network condition between a pair of network devices, the method comprising:

receiving at a receiving device of the pair of devices, packets from a transmitting device of the pair of devices via a network;

determining a first time period between receiving, from said transmitting device, a first-received packet for an initial media frame and receiving, from said transmitting device, a first-received packet for a first subsequent media frame, wherein the packets are received at one of the devices via a network and each received packet comprises a timestamp;

determining a second time period between the timestamp of the packet for the initial media frame and the timestamp of the packet for the first subsequent media frame;

determining a third time period between receiving the first-received packet for the initial media frame and receiving a first-received packet for a second subsequent media frame;

determining a fourth time period between the timestamp of the packet for the initial media frame and a timestamp of the packet for the second subsequent media frame;

identifying a network condition in dependence on a difference between the first and second time periods and a difference between the third and fourth time periods; and transmitting an indication of the identified network condition to the transmitting device so that the transmitting device can adjust its transmission properties in dependence on the identified network condition.

\* \* \* \* \*